United States Patent [19]

Boger

[11] Patent Number: 5,680,889

[45] Date of Patent: Oct. 28, 1997

[54] LOW NOISE BALL VALVE ASSEMBLY

[75] Inventor: Henry William Boger, Foxboro, Mass.

[73] Assignee: Dresser Industries, Inc., Dallas, Tex.

[21] Appl. No.: 710,688

[22] Filed: Sep. 23, 1996

[51] Int. Cl.$^6$ ............................................. F16K 5/12
[52] U.S. Cl. ................................. 137/625.32; 251/121
[58] Field of Search ....................... 137/625.3, 625.32; 251/121

[56] References Cited

U.S. PATENT DOCUMENTS

| | | |
|---|---|---|
| 4,212,321 | 7/1980 | Hulsey . |
| 4,364,415 | 12/1982 | Polon . |
| 4,479,510 | 10/1984 | Bey . |
| 4,530,375 | 7/1985 | Bey . |
| 4,540,025 | 9/1985 | Ledeen et al. . |
| 4,610,273 | 9/1986 | Bey . |
| 5,180,139 | 1/1993 | Gethmann et al. . |
| 5,218,984 | 6/1993 | Allen . |
| 5,287,889 | 2/1994 | Leinen . |
| 5,332,004 | 7/1994 | Gethmann et al. . |
| 5,400,825 | 3/1995 | Gethmann et al. . |
| 5,509,446 | 4/1996 | Bey ................................. 137/625.32 |

FOREIGN PATENT DOCUMENTS

| | | |
|---|---|---|
| 0325846 | 11/1988 | European Pat. Off. . |
| 1200688 | 9/1965 | Germany . |
| 2352370 | 4/1975 | Germany . |
| 237241 | 8/1945 | Switzerland . |

OTHER PUBLICATIONS

Series 61 and 62, High Performance Rotary Valves, INTROL, Kent Process Control, Inc., Sep. 1987.
Neles Control Valves for Gas Transmission and Distribution, Mar. 1989.
Soundtrim Modulating Low Noise Control Plug Valve, Bulletin V-37, DURCO, Jun. 1987.
Reglerventilen Som Löser Problem Med Kavitation Och Reducerar Ljud, NAF- Trimball, NAF, Sep. 1988, NAF Enertech Group.
Neles Q-Ball Standard Product Range, Liquid Phase and Gas Phase/Flashing Liquids.

Primary Examiner—John Fox
Attorney, Agent, or Firm—Haynes and Boone, L.L.P.

[57] ABSTRACT

A ball valve assembly and method in which a ball valve is rotatable in a conduit section to and from an open position in which at least a portion of a bore in the valve registers with the inlet and the outlet of the conduit section to permit the flow of the fluid through the conduit section. An insert is disposed in the bore and has a plurality of through passages formed therein for reducing the noise caused by the fluid flow though the ball valve and is operable over a relatively wide range of pressure drops and flow rates.

14 Claims, 4 Drawing Sheets

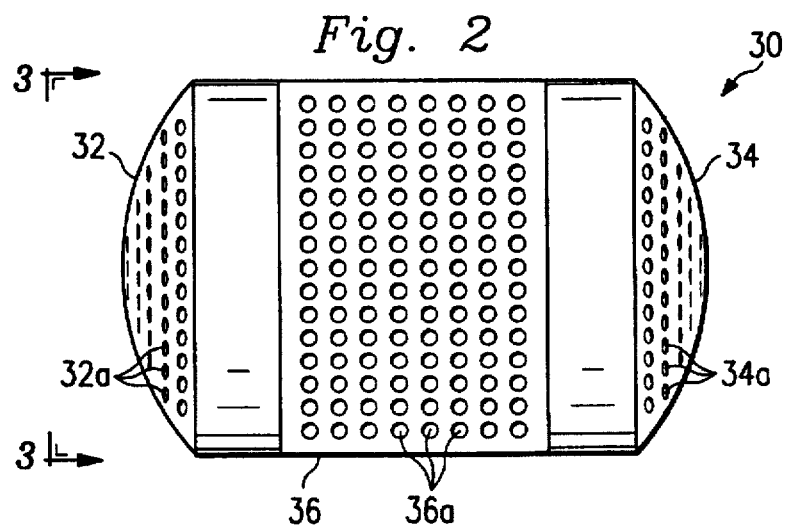
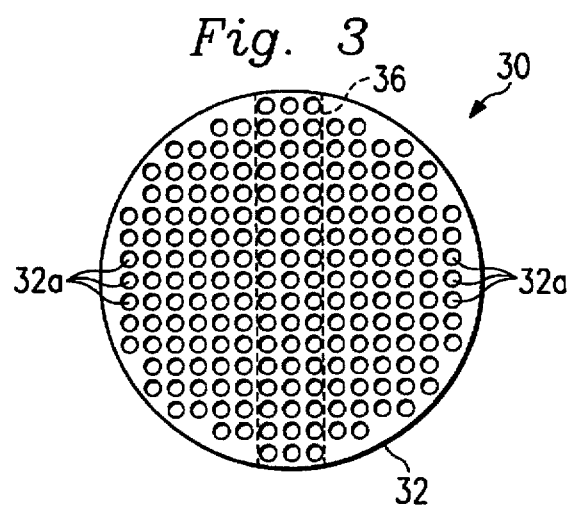
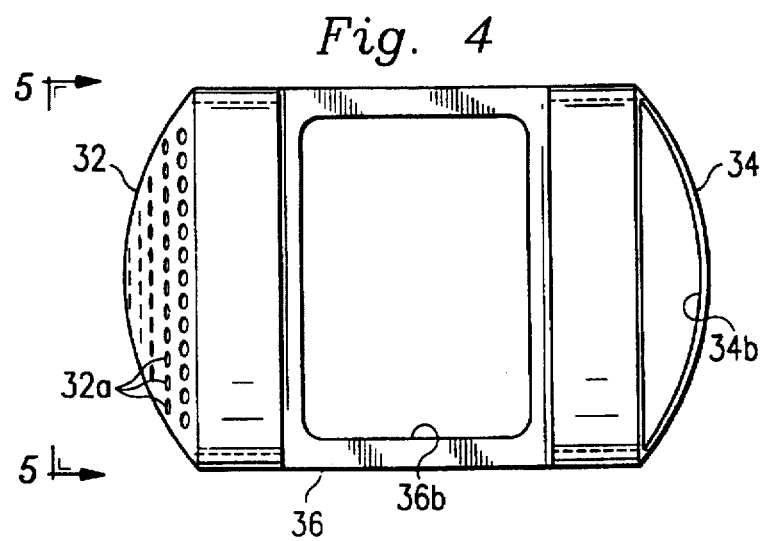

LOW NOISE BALL VALVE ASSEMBLY

BACKGROUND OF THE INVENTION

The present invention relates to a low noise ball valve assembly and, more particularly, to such an assembly for controlling the transmission and distribution of a compressible fluid.

In the transmission and distribution of compressible fluids, such as natural gas, there are requirements for valves that control a variable, such as pressure or flow rate, and operate at high pressure drops, that is, high pressure differences between the upstream and downstream pressure. As such, these valves are fitted with actuators and positioners that respond to a control signal generated by a controller or computer.

When a compressible fluid is throttled through a control valve at high pressure drop, noise is generated in the fluid aerodynamically, and subsequently is propagated through the fluid, exciting the pipe walls (principally downstream), and thereby causing noise to be propagated to the surrounding atmosphere. The result may be noise that exceeds allowable limits for worker hearing conservation.

A second concern involved with the throttling of a compressible fluid through a control valve is that it often causes excessive mechanical vibration resulting in attendant problems with the proper operation of associated measuring and controlling equipment. In addition, the vibration can also cause fatigue failure of welds or piping.

In this context, ball valves have frequently been used as shutoff valves and control valves in the transmission and distribution of natural gas. However, the availability of valve trim for ball valves that offers good noise reduction has been very limited. Also, the ball valves that do have noise reduction capability are often limited in their range of application. However, there are many applications that require a broad range of application. For example, an application such as compressor bypass service normally operates at high pressure drop throughout valve travel; while some pressure regulation applications operate over a wide range of a flow rates and have a high pressure drop at low flow rates and low valve openings, and a low pressure drop at maximum flow and large valve opening.

Therefore what is needed is a ball valve with noise reduction capability that can operate over a wide range of pressure drops and flow rates.

SUMMARY OF THE INVENTION

The present invention, accordingly, provides a ball valve assembly in which the noise generated by the flow of the fluid is significantly reduced. Also, the ball valve assembly of the present invention is operable over a relatively wide range of pressure drops and flow rates. To this end, the valve assembly comprises a ball valve having a through bore formed therein, the valve being rotatable in a conduit section between and an open position in which at least a portion of the bore registers with the inlet and the outlet of the conduit section to permit the flow of the fluid through the conduit section, and a closed position in which fluid flow through the conduit section is prevented. An insert is disposed in the bore for reducing the noise caused by the fluid flow though the ball valve. The insert is formed by a first portion having an outer diameter substantially corresponding to the inner diameter of the bore and exposed to the inlet, a second portion having an outer diameter substantially corresponding to the inner diameter of the bore and exposed to the outlet and a third portion extending between the portions and having and an outer dimension less than that of the diameter of the bore. A plurality of through passages extend through the insert portions for permitting fluid flow from the inlet, through the insert, and to the outlet while reducing the noise generated by the fluid flow.

A major advantage is achieved with the ball valve assembly of the present invention since the noise generated by the flow of the fluid is reduced significantly, yet the ball valve assembly is operable over a relatively wide range of pressure drops and flow rates.

BRIEF DESCRIPTION OF THE DRAWINGS

FIG. 2 is a view taken from the plane 2—2 of FIG. 1.

FIG. 3 is a view taken from the plane 3—3 of FIG. 2.

FIG. 4 is a view similar to FIG. 2, but depicting an alternate embodiment of the ball valve assembly of the present invention.

DESCRIPTION OF THE PREFERRED EMBODIMENT

Figure 1A:
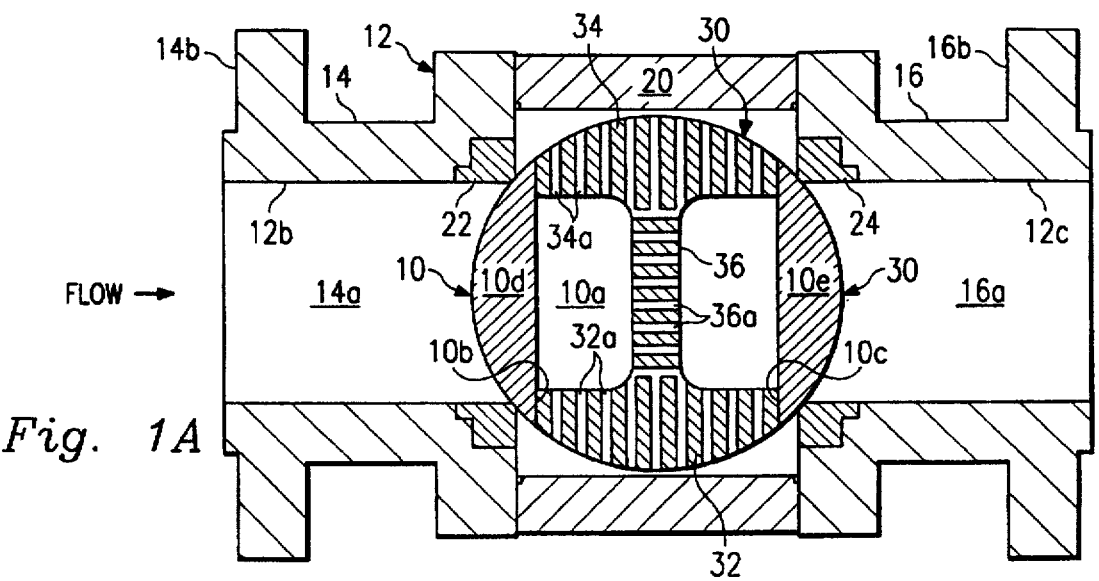
FIGS. 1A–1C are cross-sectional views depicting the ball valve assembly of the present invention in three operating modes.

Referring to FIG. 1 of the drawings, the ball valve assembly of the present invention includes a ball valve 10 disposed in a valve body 12 formed by a cylindrical inlet section 14 having an inlet bore 14a and a circular flange 14b projecting therefrom for connection to a pipe (not shown) for supplying a compressible fluid, such as natural gas, to the inlet section. A cylindrical outlet section 16 is also provided which has an outlet bore 16a and a circular flange 16b projecting therefrom for connection to a pipe (not shown) for receiving the fluid from the outlet section. An outer support ring 20 extends between the sections 14 and 16, with the inner surface of the ring in close proximity with the outer surface of the ball valve 10.

A pair of axially-spaced seal assemblies 22 and 24 are mounted in circular notches, or grooves, provided in the inner end portions of the inlet section 14 and the outlet section 16, respectively. The support ring 20 is connected between the sections 14 and 16 in any known manner, such as by bolts, or the like (not shown). The support ring 20 and the seal assemblies 22 and 24 will not be described in any further detail since they are conventional.

It is understood that a shaft, or stem, is connected to the valve 10 to rotate it in a manner to be described. The latter stem extends in a direction perpendicular to the plane of the drawings and is not shown for the convenience of presentation since it is also conventional. Rotation of the stem causes corresponding rotation of the ball valve 10 relative to the seals 22 and 24 with the latter functioning to provide a fluid seal, all in a conventional manner.

The valve 10 is in the form of a spherically shaped ball having a central through bore 10a connecting an inlet end 10b and an outlet end 10c. Thus, two solid surface areas 10d and 10e are defined which, in the closed position of the valve 10 shown in FIG. 1A, blocks the flow of fluid from the inlet section 14 to the outlet section 16.

According to a main feature of the present invention, an insert 30 is provided in the bore 10a of the valve 10 and is designed to reduce the noise generated as a result of the flow of fluid through the valve. The insert 30 is shown in FIGS. 1A–1C, 3 and 4, and is formed by a first disc portion 32 having an outer curved surface which forms a continuation of the curved surfaces of the solid sections 10d and 10e of the valve 10, and second disc portion 34 also having and an outer curved surface which forms a continuation of the curved surfaces of the latter solid sections. The insert 30 also includes a flat portion 36 extending perpendicular to, and connecting, the disc portions 30a and 30b and is preferably formed integrally with the latter portions. The height of the flat portion 36 is considerably less that the inner diameter of the bore 10a so as to permit fluid flow between the disc portions 32 and 34, as will be explained.

A series of spaced, parallel, through passages 32a are formed through the disc portion 32 for permitting the flow of fluid into the valve bore 10a. Similarly, a series of spaced, parallel, through passages 34a are formed through the disc portion 34 and are aligned with the passages 32a for permitting the flow of fluid from the valve bore 10a. A series of spaced, parallel, through passages 36a are also formed through the flat portion 36 and extend perpendicular to the passages 32a and 34a for permitting the flow of fluid across the valve bore 10a, as will be explained.

The fluid entering the valve 10 from the inlet section 14 of the valve body 12 thus passes through the passages 32a and into the valve bore 10a, and under certain circumstances to be explained, passes through the passages 36a in the flat portion 36, before exiting the bore through the passages 34a in the disc portion 34. The diameters of the passages 32a, 34a and 36a are relatively small and function to significantly reduce the noise level that would otherwise be generated by the flow of the fluid through the valve bore 10a, as will be explained.

Figure 1B:
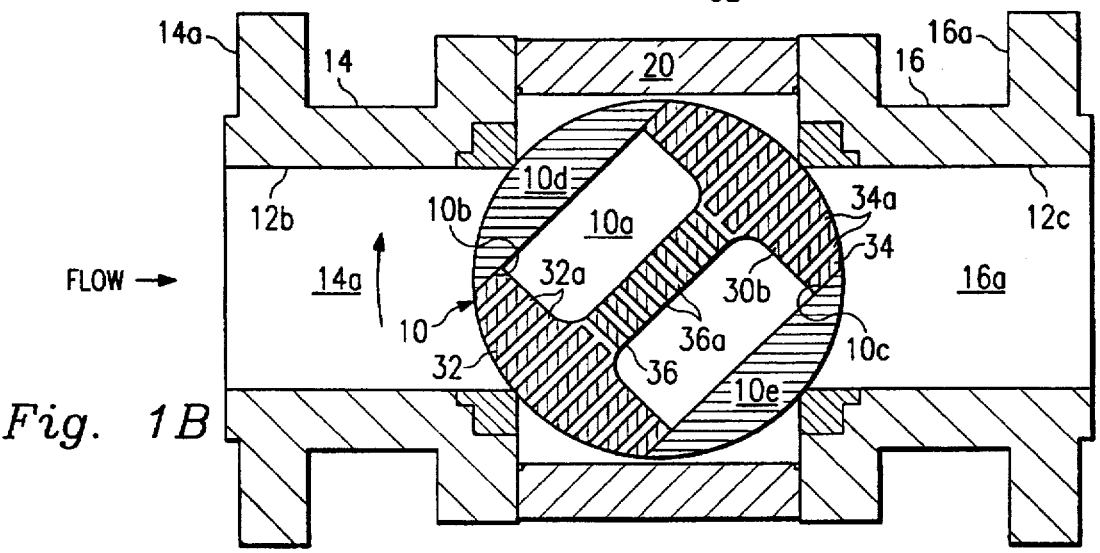

The valve 10 is depicted in its closed position in FIG. 1A in which, the solid section 10d blocks the flow of fluid from the inlet bore 14a through the valve 10. In the event fluid flow is desired, the valve stem (not shown) is rotated in a clockwise direction as viewed in FIGS. 1A–1C. This causes the valve 10 to rotate in the clockwise direction shown by the arrow in FIG. 1B and thus exposes a portion of the flow passages 32a of the disc portion 32 to the fluid in the bore 14a. The fluid thus flows through from the bore 14a, through the exposed passages 32a and into the valve bore 10a. In the position of FIG. 1B, a portion of the passages 34a of the disc portion 34 are exposed to the outlet bore 16a, which passages are located on the opposite side of the flat portion 36 from the exposed passages 32a. Thus, the fluid passes from the passages 32a through the passages 36a in the valve 10 bore 10a before exiting the valve through the passages 34a. The fluid then passes through the outlet bore 16a to an outlet pipe, or the like, connected to the outlet section 16.

Figure 1C:
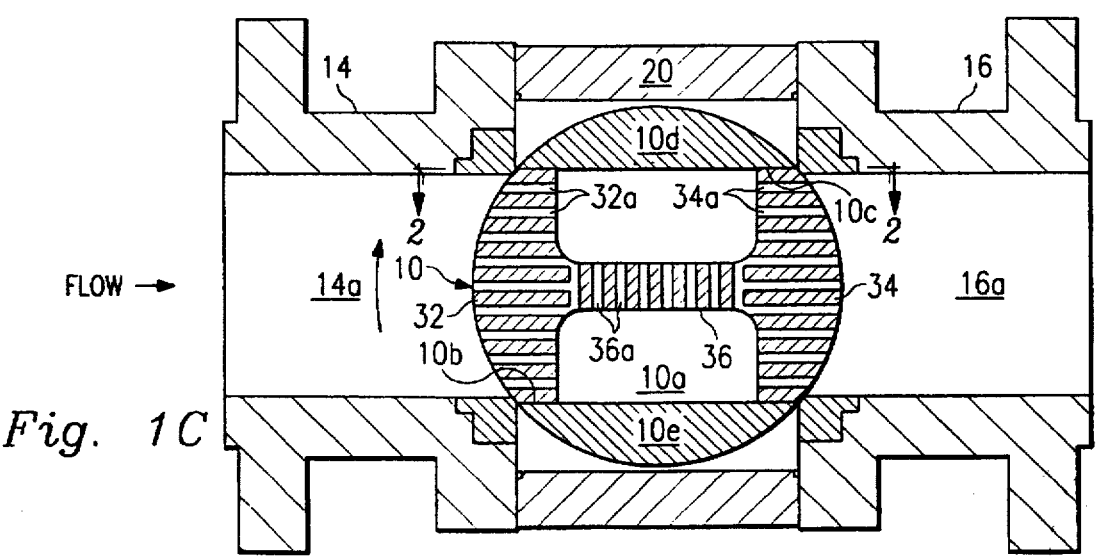
Figure 5:
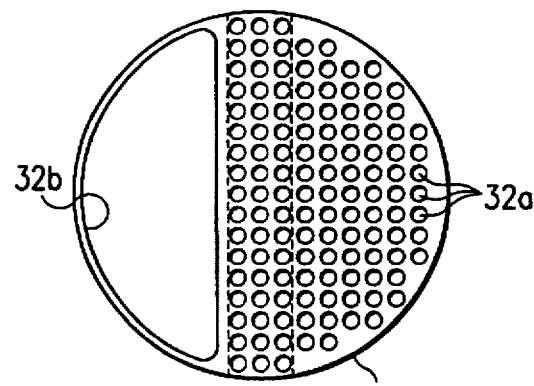
FIG. 5 is a view taken from the plane 5—5 of FIG. 4.

If required by the operating conditions, the rotation of the valve 10 continues in the clock-wise direction until the valve reaches the fully opened position shown in FIG. 1C. In this position, all of the passages 32a in the disc portion 32 are exposed to the fluid in the inlet bore 14a and all of the passages 34a in the disc portion 34 are exposed to the outlet bore 16a. Thus, a majority of the fluid flows from the inlet bore 14a, through the passages 32a, through the bore 10a in the interior of the valve 10, and exits the valve through all of the passages 34a; with very little flow occurring through the passages 36a in the flat portion 36.

During this movement from the fully closed position of FIG. 1A to the fully opened position of FIG. 1C, all flow through the valve 10 is directed through the passages 32a and 34a, and, under the conditions described above, through the passages 36a. This considerably reduces the noise level of the fluid as it passes from the inlet bore 14a, through the valve 10 and to the outlet bore 16a. In applications in which there is a constant pressure drop across the valve 10, the noise reduction increases with increases in the valve opening.

The embodiment of FIGS. 4–7 is similar to that of FIGS. 1–3 and contains essentially the same structure as that of FIGS. 1–3 which is given the same reference numerals. According to the embodiment of FIGS. 4–7, a portion of the through passages 32a and 42a of the disc portions 32 and 34, respectively are eliminated and two relatively large through passages, or openings 32b and 34b, respectively are provided. More specifically, and referring to FIGS. 4 and 5, the lower portion of the disc portion 32 has a relative large opening 32b formed therethrough which replaces a portion of the passages 32a in the previous embodiment. The remaining portion of the disc portion 32 is provided with the passages 32a as in the previous embodiment.

The upper portion of the disc portion 34 has a relative large opening 34b formed therethrough which replaces a portion of the passages 34a in the previous embodiment. The remaining portion of the disc portion 34 is provided with the passages 34a as in the previous embodiment. All of the passages 36a of the flat portion 36 are eliminated in favor of a single large through opening 36b.

The closed position of the embodiment of FIGS. 4–7 is not shown since it is the same as that shown in FIG. 1A of the embodiment of FIGS. 1–3, in which the solid section 10d of the valve 10 blocks the flow of fluid from the inlet bore 14a through the valve 10.

Figure 6:
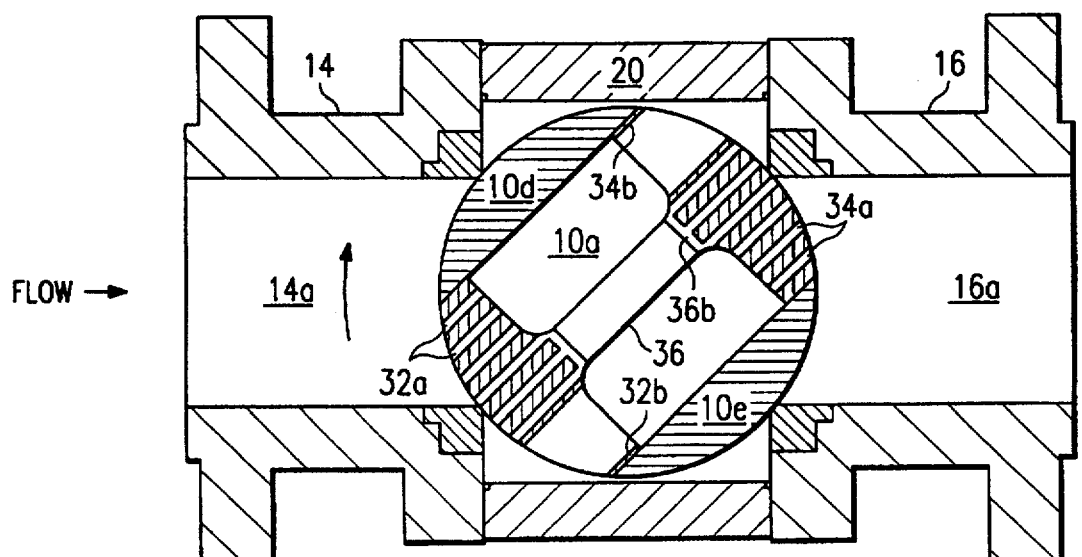
FIGS. 6 and 7 are cross-sectional views depicting two operational modes of the ball valve assembly of FIGS. 4 and 5.

In the event fluid flow is desired, the valve stem (not shown) is rotated in a clockwise direction shown by the arrow in FIG. 6 and thus exposes a portion of the flow passages 32a of the disc portion 32 to the fluid in the bore 14a, as in the previous embodiment. The fluid thus flows from the bore 14a, through the exposed passages 32a and into the valve bore 10a. The fluid then flows through the large opening 36b of the flat portion 36 in the interior of the valve 10 before exiting the valve through the passages 34a for flow to and an outlet pipe, or the like, connected to the outlet section 16.

Figure 7:
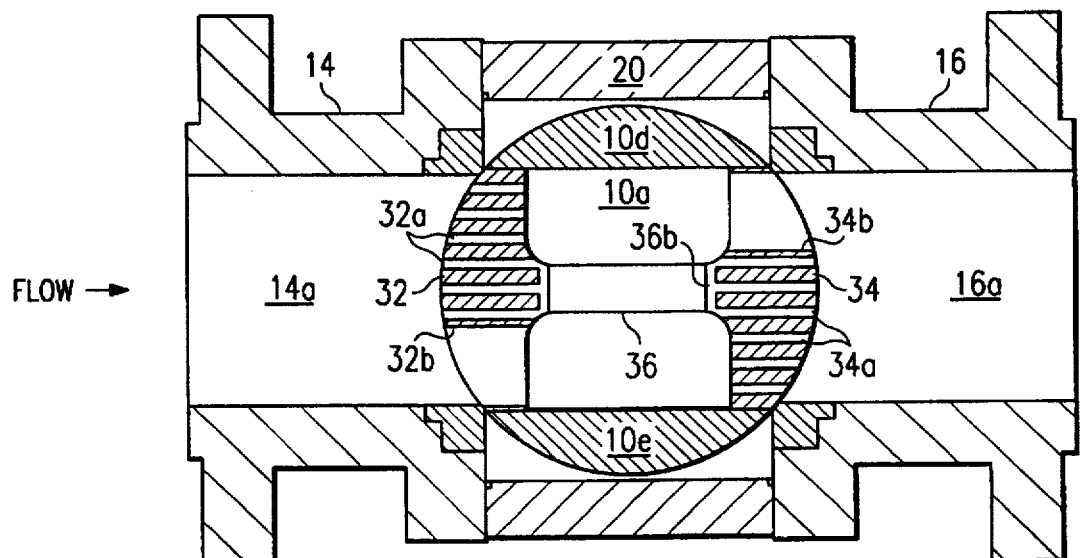

Upon further rotation of the valve 10 in the clock-wise direction, the valve reaches the fully opened position shown in FIG. 7. In this position, all of the passages 32a, as well as the large opening 32b are exposed to the fluid in the inlet bore 14a and all of the passages 34a in the disc portion 34, as well as the large opening 34b are exposed to the outlet bore 16a. In this position, since the large openings 32b, 34b, and 36b provide the least resistance to fluid flow, the major portion of the fluid flows from the inlet bore 14a, through the opening 32b, through the opening 36b, and exits through the opening 34b.

Thus, according to the embodiment of FIGS. 4–7, substantial noise reduction is provided at the partial opening of the valve as shown in FIG. 6; while in the fully opened position shown in FIG. 7, high flow capacity is achieved (with reduced noise reduction) by virtue of the flow through the relatively large openings 32b, 36b and 34b. This embodiment is especially suited for applications in which a relatively high pressure drop occurs at relatively low opening of the valve 10, and the pressure drop lowers as the valve opening increases.

Figure 8:
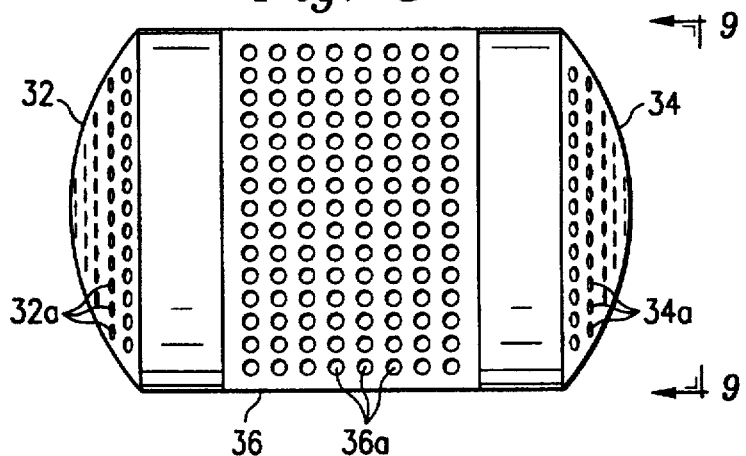
FIGS. 8 and 9 are views similar to FIGS. 2 and 3 respectively, but depicting another alternative embodiment of the ball valve assembly of the present invention.
Figure 9:
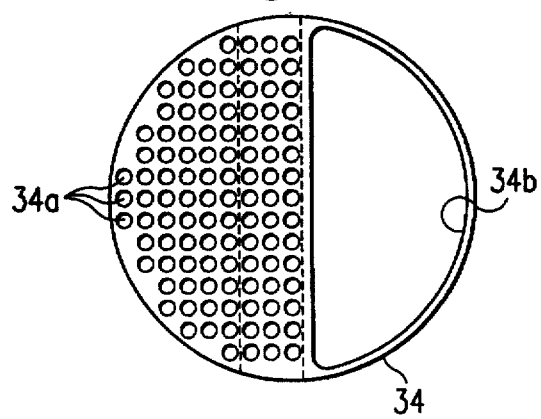
Figure 10:
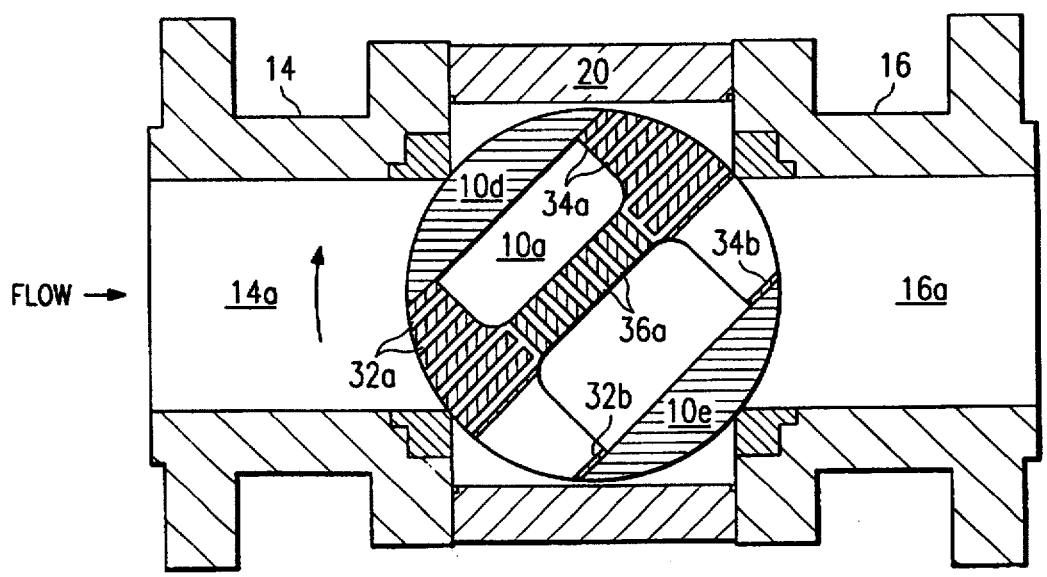
FIG. 10 is a cross-sectional view depicting an operational mode of the ball valve assembly of FIGS. 8 and 9.

The embodiment of FIGS. 8–10 is similar to that of the embodiments of FIGS. 1–3 and FIGS. 4–7 and also contains essentially the same structure which is given the same reference numerals. According to the embodiment of FIGS. 8–10, two relatively large through opening 32b and 34b (FIG. 10) are provided in the lower portions of the disc portions 32 and 34, respectively, in place of the flow passages 32a and 34a, respectively in the latter lower portions. The remaining upper portions of the disc portions 32 and 34, as well as the entire flat portion 36 are provided with the passages 32a, 34a and 36a, respectively, as in the embodiment of FIGS. 1–3.

The closed position of the embodiment of FIGS. 8–10 is the same as that shown in FIG. 1A of the embodiment of FIGS. 1–3, and is therefore not shown. In this position, the solid section 10d of the valve 10 blocks the flow of fluid from the inlet bore 14a through the valve 10. When fluid flow is desired, the valve stem (not shown) is rotated in a clockwise direction shown by the arrow in FIG. 10 and thus exposes a portion of the flow passages 32a of the disc portion 32 to the fluid in the bore 14a, and the opening 34b to the bore 16a. The fluid thus flows through from the bore 14a, through the exposed passages 32a and into the valve bore 10a. The fluid then flows through the passages 36a of the flat portion 36 in the interior of the valve 10 before exiting the valve through the large opening 34b for flow to an outlet pipe, or the like, connected to the outlet section 16. When the valve is rotated to its fully opened position (not shown, but the same as FIG. 1C) the passages 32a and the large opening 32b are fully exposed to the bore 14a and the passages 34a and the large opening 34b are fully exposed to the bore 16a. In this position a majority of the fluid flows through the opening 32b, through the valve bore 10a and exits through the opening 34b, thus bypassing the passages 36a in the flat portion 36.

Thus according to the embodiment of FIGS. 8–10, at partial opening two stage pressure reduction is achieved, while at full opening the major portion of the flow passes directly through the openings 32b and 34b without any change in direction, thus providing relative high flow capacity.

The present invention thus enjoys several advantages. For example, the noise generated by the flow of the fluid is reduced significantly due to the provision of the flow passages 32a, 34a and 36a in the insert 30 of the valve 10. Another advantage of the ball valve assembly and method of the present invention is that the valve is operable over a relatively wide range of pressure drops and flow rates.

It is understood that modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A valve assembly for controlling the flow of fluid through a conduit section having and an inlet and an outlet, the valve assembly comprising a ball valve having a through bore formed therein, the valve being rotatable in the conduit section between and an open position in which at least a portion of the bore registers with the inlet and the outlet of the conduit section to permit the flow of the fluid through the conduit section, and a closed position in which fluid flow through the conduit section is prevented; and an insert disposed in the bore for reducing the noise caused by the fluid flow though the ball valve, the insert comprising a first portion having an outer diameter substantially corresponding to the inner diameter of the bore and exposed to the inlet, a second portion having an outer diameter substantially corresponding to the inner diameter of the bore and exposed to the outlet and a third portion extending between the sections and having an outer dimension less than that of the diameter of the bore, and a plurality of through passages extending through the insert portions for permitting fluid flow from the inlet, through the insert, and to the outlet while reducing the noise generated by the fluid flow.

2. The assembly of claim 1 wherein the third insert portion connects the first and second insert portions.

3. The assembly of claim 1 wherein the passages through the first, second and third insert portions are relative small in diameter.

4. The assembly of claim 3 wherein the fluid flows from the passages in the first insert portion, through the space between the third insert portion and the valve bore, and through the passages in the second insert portion.

5. The assembly of claim 1 wherein a plurality of the passages through at least one of the insert portions have relatively small diameters and at least one passage through at least one of the inset portions has a relatively large diameter.

6. The assembly of claim 5 wherein the third insert portion has one relatively large-diameter passage.

7. The assembly of claim 5 wherein the first and second insert portions each have a plurality of relatively small-diameter passages and one relatively large-diameter passage.

8. The assembly of claim 7 wherein, upon rotation of the ball valve from its closed position to its open position, the relative small-diameter passages in the first insert portion are exposed to the inlet before the relatively large-diameter passage in the latter insert portion.

9. The assembly of claim 7 wherein the third insert portion has a relatively large-diameter passage.

10. The assembly of claim 9 wherein, upon rotation of the ball valve from its closed position to a partially opened position, the relative small-diameter passages in the first and second insert portions are initially exposed to the inlet and outlet, respectively, before their corresponding large-diameter passages so that the fluid flows through the relatively small-diameter passages in the first insert portion, through the large-diameter passage in the third second insert portion and through the relatively small diameter passages in the second insert portion.

11. The assembly of claim 10 wherein, upon rotation of the ball valve to its fully opened position, the relative small-diameter and the relatively large diameter passages in the first and second insert portions are exposed to the inlet and outlet, respectively, so that a substantial portion of the fluid flows through the relatively large-diameter passages in the first, second and third insert portions.

12. The assembly of claim 7 wherein the third insert portion has a plurality of relatively small-diameter passages.

13. The assembly of claim 12 wherein, upon rotation of the ball valve from its closed position to a partially opened position, the relative small-diameter passages in the first insert portions are initially exposed to the inlet before their corresponding large-diameter passages; and the relatively large-diameter passage in the second insert portion is initially exposed to the outlet before its corresponding small-diameter passages so that the fluid flows through the relatively small-diameter passages in the first insert portion, through the small-diameter passages in the third insert portion and through the relatively large-diameter passage in the second insert portion.

14. The assembly of claim 13 wherein, upon rotation of the ball valve to its fully opened position, the relative small-diameter and the relatively large diameter passages in the first and second insert portions are exposed to the inlet and outlet, respectively, so that a substantial portion of the fluid flows through the relatively large diameter passages in the first and second insert portions while bypassing the relatively small-diameter passages in the third insert portion.

* * * * *